(12) United States Patent
Mouton et al.

(10) Patent No.: US 7,925,871 B2
(45) Date of Patent: Apr. 12, 2011

(54) IDENTIFICATION AND CORRECTION OF CYCLICALLY RECURRING ERRORS IN ONE OR MORE BRANCH PREDICTORS

(75) Inventors: Louis Marie Vincent Mouton, Vallauris (FR); Nicolas Huot, Valbonne (FR); Stephane Eric Sebastien Brochier, Chateauneuf de Grasse (FR); Gilles Eric Grandou, Plascassier (FR)

(73) Assignee: ARM Limited, Cambridge (GB)

( * ) Notice: Subject to any disclaimer, the term of this patent is extended or adjusted under 35 U.S.C. 154(b) by 481 days.

(21) Appl. No.: 12/071,279

(22) Filed: Feb. 19, 2008

(65) Prior Publication Data

US 2009/0210685 A1  Aug. 20, 2009

(51) Int. Cl.
*G06F 9/00* (2006.01)
*G06F 9/44* (2006.01)

(52) U.S. Cl. .................. 712/239; 712/244

(58) Field of Classification Search .......... 712/239, 712/244
See application file for complete search history.

(56) References Cited

U.S. PATENT DOCUMENTS

| | | | | |
|---|---|---|---|---|
| 5,838,943 A * | 11/1998 | Ramagopal et al. | ........... | 712/218 |
| 5,935,238 A * | 8/1999 | Talcott et al. | ............. | 712/206 |
| 5,964,869 A * | 10/1999 | Talcott et al. | ............. | 712/236 |
| 6,757,816 B1 * | 6/2004 | Yoaz et al. | ............. | 712/239 |
| 7,685,410 B2 * | 3/2010 | Shen et al. | ............. | 712/237 |
| 2002/0069375 A1 * | 6/2002 | Bowen | ............. | 713/400 |
| 2004/0148497 A1 * | 7/2004 | Vahidsafa et al. | ............. | 712/239 |
| 2004/0255104 A1 * | 12/2004 | Akkary et al. | ............. | 712/239 |
| 2008/0195844 A1 * | 8/2008 | Shen et al. | ............. | 712/205 |

OTHER PUBLICATIONS

Chang, Po-Yung; Hao, Eric; and Patt, Yale N. "Target Prediction for Indirect Jumps". ACM. © 1997. pp. 274-283.*
Jacobsen, Erik; Rotenberg, Eric; and Smith, J.E. "Assigning Confidence to Conditional Branch Predictions". IEEE. © 1996. pp. 142-152.*
Eden, A. N. et al.; "The Yags Branch Prediction Scheme", University of Michigan, Dept. EECS, pp. 1-9.
Sendag, R. et al., "Branch Misprediction: Complementary Branch Predictors", IEEE Computer Architecture Letters, vol. 6, pp. 1-4, (2007).

* cited by examiner

*Primary Examiner* — Aimee J Li
(74) *Attorney, Agent, or Firm* — Nixon & Vanderhye P.C.

(57) ABSTRACT

A data processing apparatus 2 is provided with one or more branch predictors 10 for generating branch predictions. A supervising predictor 12 is responsive to at least a stream of branch predictions to identify one or more cyclically recurring errors in the branch predictors and generate corrected behaviours for a prefetch unit 4.

27 Claims, 4 Drawing Sheets

IDENTIFICATION AND CORRECTION OF CYCLICALLY RECURRING ERRORS IN ONE OR MORE BRANCH PREDICTORS

BACKGROUND OF THE INVENTION

1. Field of the Invention

This invention relates to the field of data processing systems. More particularly, this invention relates to the field of branch prediction within data processing systems.

2. Description of the Prior Art

As instruction pipeline depths have become greater, the penalty for incorrectly predicting the program flow has increased. When program flow is incorrectly predicted, then instructions within the instruction pipeline will need to be flushed and the correct instructions fetched. This consumes many processing cycles and wastes energy.

In order to accurately predict branch behaviour it is known to provide one or more branch prediction mechanisms within a data processing apparatus to direct the prefetching and supply of instructions to the instruction pipeline(s). These branch prediction mechanisms can be highly complex and require a large number of gates and a significant amount of power to operate. The typical approach to increasing branch prediction accuracy is to increase these branch prediction mechanisms in size and complexity, e.g. increasing the size of a branch target address cache, increasing the size of a global history table etc. The incremental increase in prediction accuracy associated with increasing the resources allocated to the branch predictors reduces as the branch predictors increase in size and complexity. A significant proportion of a high performance data processing integrated circuit may be consumed by sophisticated branch prediction mechanisms.

SUMMARY OF THE INVENTION

Viewed from one aspect the present invention provides apparatus for processing data under control of a stream of program instructions, said apparatus comprising:

one or more branch predictors responsive to said stream of program instructions to generate branch predictions for at least some branch instructions within said stream of program instructions; and a supervising predictor responsive to at least a stream of branch predictions generated by said one or more branch predictors to identify one or more cyclically recurring errors in said one or more branch predictors and to generate respective corrected behaviours for use when said one or more cyclically recurring errors occur.

The present invention recognises that the overall performance of the system can be improved by the provision of a supervising predictor which rather than seeking to make a prediction based on the instruction stream using a different prediction technique, or seeking to extend the accuracy of the existing branch predictors (e.g. increasing their cache or storage size) instead takes an approach of identifying cyclically recurring errors in the operation of the existing one or more branch predictors and generating respective correcting behaviours for use when these cyclically recurring errors occur. In this way, the cyclically occurring errors which arise in the operation of the one or more branch predictors can be corrected for with a relatively low additional overhead producing a worthwhile gain in performance with relatively little overhead cost. The cyclically occurring error correspond to code which is often replaying and hence there is a worthwhile gain in correcting these errors.

It will be appreciated that the supervising predictor can be responsive to one or more cyclically recurring errors of a variety of different forms, not merely that the branch predictors incorrectly identify a branch instruction as one of taken/not taken. However, a significant class of errors which the supervising predictor is able to correct for do include incorrect branch predictions and the respective corrected behaviours would be corrected branch predictions.

The cyclically recurring errors more generally can include an incorrect prediction direction, an incorrect identification of a program instruction as a branch instruction (i.e a false positive), an incorrect prediction of a branch target address, an incorrect identification of a type of branch instruction (e.g. a branch instruction identified as conditional when it is unconditional) and a missing prediction for a branch instruction (e.g. a branch instruction within the program stream is not identified as such by any of the one or more branch predictors).

The cyclically recurring errors can arise as a consequence of a variety of different behaviours within the one or more branch predictors. These behaviours include aliasing within a global history table, aliasing within a branch target address cache and an out-of-date branch target address cache entry.

A feature of the supervising predictor is that it operates at a level separate from the one or more branch predictors and seeks to identify and correct cyclically recurring errors in the predictors rather than better interpret the instruction stream. This enables the supervising predictor to be added without significant re-engineering of the one or more branch predictors. A characteristic of this arrangement may be that the one or more branch predictors are updated independently of the corrected behaviours such that the one or more branch predictors operate to generate their branch predictions independently of the supervising predictor. Thus, the corrected behaviours controlled by the supervising predictor are not fed back to the one or more branch predictors seeking to increase the accuracy of those one or more branch predictors. This is different to normal branch predictor behaviour in which the feedback of correct behaviour is used to configure the one or more branch predictors.

The supervising predictor can improve its ability to identify cyclically recurring errors by tracking program flow following an error generated by the branch monitor and generating an identifying value indicative of that program flow. Recording the entire program flow would be too burdensome and an identifying value indicative of program flow provides a good balance between the specificity with which a cyclically recurring error can be identified and the overhead requirements.

The identifying value can track program flow in a variety of different ways. In some embodiments the identifying value is dependent upon the program counter values of program instructions executed within the program flow. The majority of program instructions executed follow sequentially in order and the program counter values most indicative of program flow tend to occur at branches e.g. non-sequential accesses to a branch target address cache known as program flow edges.

A hash value can be used as the identifying value with feedback from a preceding value of the hash value and with updates to the hash value being performed upon occurrence of update events. These update events may be, as discussed, execution of program instructions, generation of branch predictions or non-sequential accesses to a branch target address cache indicating an edge in program flow.

The characteristics used to update a hash value may include one of more of the program counter address, a branch target address of a taken branch and a branch target address of an out-of-sequence access to a branch target address cache.

An identifying value memory can be used to store identifying values when an incorrect prediction is generated.

The identifying values can have an associated count value indicative of how many times an associated error has occurred and this count value can be used to gate activity of the supervising predictor in acting upon that identifying value by allowing the corrected behaviour to be used only when the count value exceeds a threshold level.

Viewed from another aspect the present invention provides apparatus for processing data under control of a stream of program instructions, said apparatus comprising:

one or more branch predictor means for generating, in response to said stream of program instructions, branch predictions for at least some branch instructions within said stream of program instructions; and supervising predictor means for identifying, in response to at least a stream of branch predictions generated by said one or more branch predictors, one or more cyclically recurring errors in said one or more branch predictors and for generating respective corrected behaviours for use when said one or more cyclically recurring errors occur.

Viewed from a further aspect the present invention provides a method of processing data under control of a stream of program instructions, said apparatus comprising:

in response to said stream of program instructions, generating branch predictions for at least some branch instructions within said stream of program instructions using one or more branch predictors; and in response to at least a stream of branch predictions generated by said one or more branch predictors, identifying one or more cyclically recurring errors in said one or more branch predictors and generating respective corrected behaviours for use when said one or more cyclically recurring errors occur using a supervising predictor.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
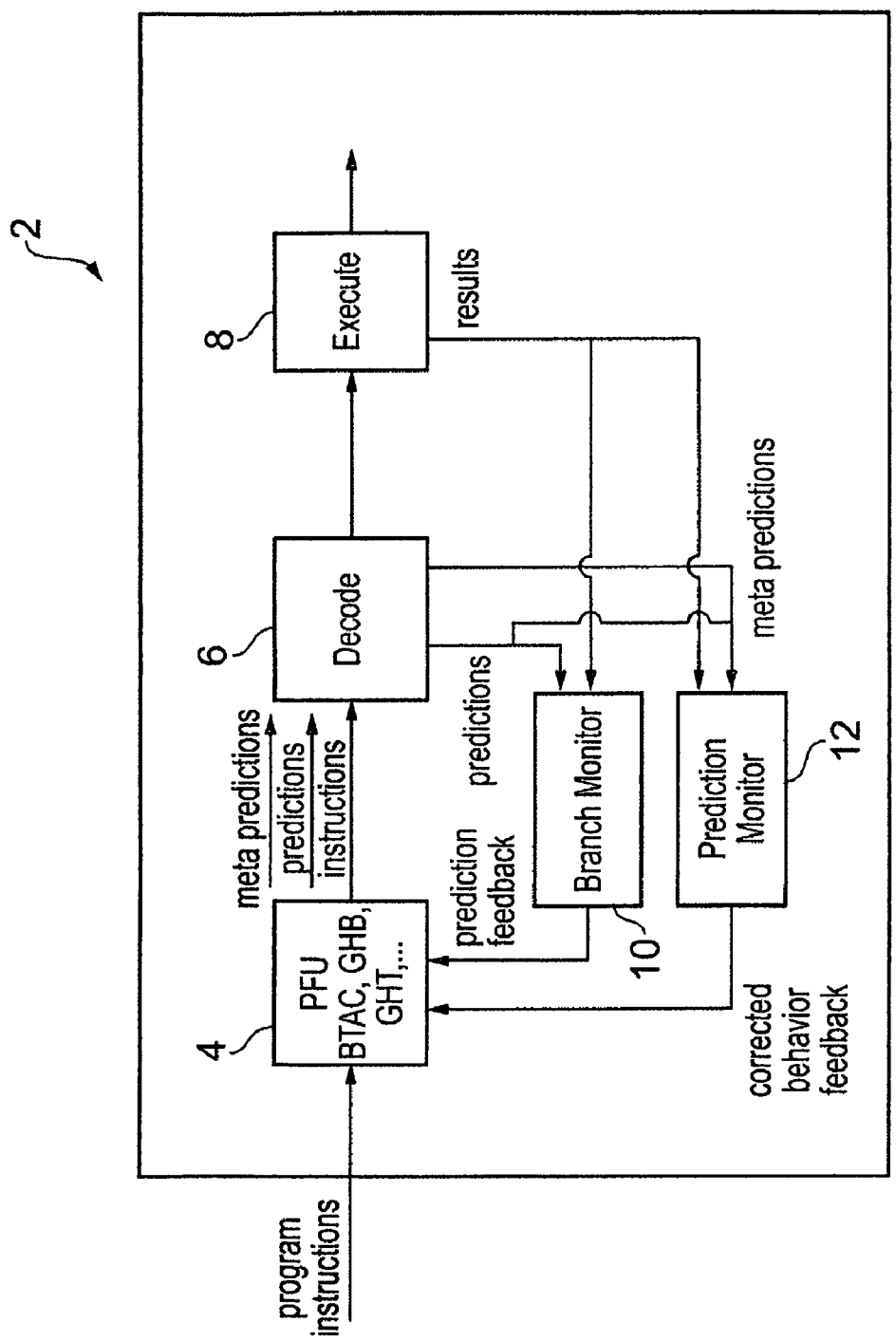
FIG. 1 schematically illustrates a data processing apparatus including one or more branch predictors and a supervising predictor.

FIG. 1 illustrates a data processing apparatus 2 in the form of an integrated circuit which performs data processing operations in response to a stream of program instructions. The program instructions are supplied to an instruction processing pipeline. Part of this instruction processing pipeline is illustrated in FIG. 1. The stages of the instruction processing pipeline schematically illustrated are a prefetch unit 4 (which includes one or more branch predictors such as a branch target address cache, a global history table operating in conjunction with a global history buffer and other branch prediction mechanisms), a decode unit 6 and an execute unit 8. It will be appreciated by those in this technical field that many further elements will typically be present within the data processing apparatus 2. These elements will include, for example, the data path elements such as adders, multipliers and logic units as well as register banks, load store units and many other different circuit elements which will be familiar to those in this technical field. The present technique is directed toward the branch prediction behaviour of the data processing apparatus 2 and accordingly it is these elements which are illustrated in FIG. 1 and discussed in more detail below.

Shown in FIG. 1 is a branch monitor unit 10 which verifies the branch predictions against the execution results to provide feedback to the branch predictors. The different types of branch predictor that may be employed to achieve accurate branch prediction will be known to those in this technical field. The action of a prediction monitor 12 (which includes the supervising predictor) illustrated in FIG. 1 is substantially independent of the nature of the underlying one or more branch predictors. The branch predictors update their behaviour independently of the action of the supervising predictor and the form of the branch predictors can be unaltered from their conventional form.

The prediction monitor 12 is responsive to the results of execution of program instructions by the execution unit 8 as well as any metapredictions made by the supervising predictor associated with the program instructions being executed in order to identify cyclically recurring errors in the one or more branch predictors. The supervising predictor is not seeking to be responsive to the program instruction stream itself to identify branch instructions and predict their behaviour, but is instead operating at a higher level focusing on identifying cyclically recurring errors in the behaviour of the underlying branch predictors. This is a relatively simpler task and yet yields a worthwhile improvement in performance. The branch predictors will often have a high degree of accuracy and the remaining errors in the operation of the prefetch unit 4 will be relatively small in number and in practice many of these will be cyclically recurring errors arising as a consequence of the large scale behaviour of the program instruction stream being executed. Thus, these cyclically recurring errors can be identified by the supervising predictor and corrected behaviour can be instructed to the prefetch unit 4.

Figure 2:
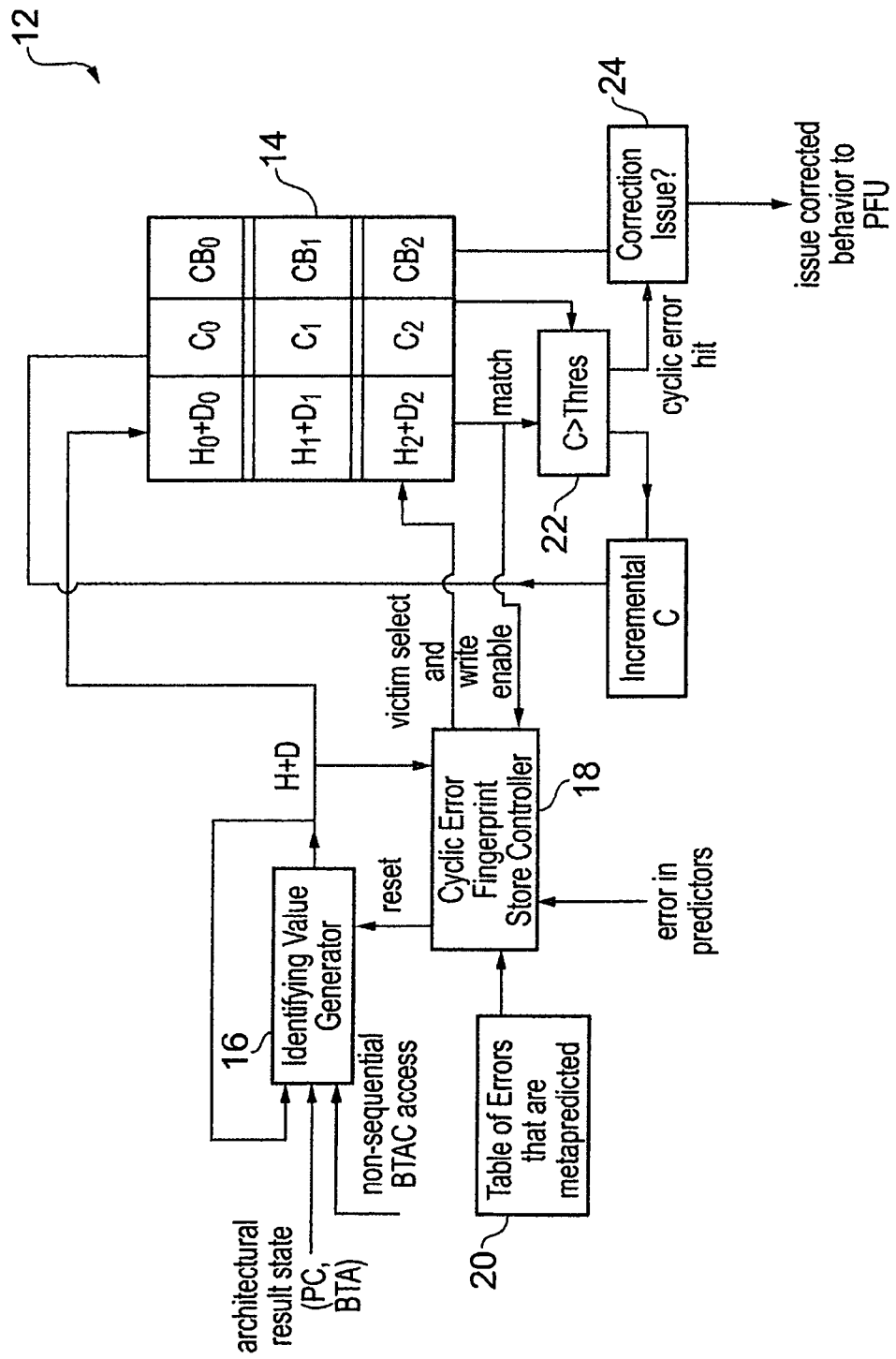
FIG. 2 schematically illustrates the supervising predictor.

FIG. 2 schematically illustrates the prediction monitor 12 in more detail. The prediction monitor predictor 12 includes an identifying value table 14, which in this example embodiment has three entries. Each entry comprises a hash value H, a distance value D from the hash value, a count value associated with that identifying value C and a corrected behaviour specifying value CB. An identifying value generator 16 generates a hash value H each time a non-sequential branch target address cache access occurs (i.e. an edge in program flow arises) in dependence upon an architectural result state at that point in time (e.g. a program counter address and a branch target address) as well as a feedback value of at least the previous hash value H.

The identifying value generator 16 also keeps count of a distance value D indicative of how many program instructions have been executed since the last hash value H was generated. In this way, the hash value H and the distance value D track the program flow and provide an identifying value indicative of the point in the program flow each time an error in the branch predictors 10 arises. These errors are signalled to the supervising predictor 12 and input to a store controller 18. The store controller 18 selects a victim entry within the identifying value table 14 into which a new hash value H and a new distance value D are to be written. The victim selection can take place in a number of different ways, such as the entry currently having the lowest count value C, a least recently used entry or a randomly selected entry. The store controller 18 also generates a reset signal to the identifying value generator 16 to at least reset the distance value D to zero. The hash value could also be zeroed. As an alternative to zeroing the hash value, the system could wait until the hash value converges (i.e. requiring a hash algorithm with a linear information loss). Such an implementation may not use a count value C as the convergence time of the algorithm will provide a threshold mechanism.

A table of errors 20 that are metapredicted by the supervising predictor 12 may be programmed such that only certain types of error signalled to the store controller trigger it to store an identifying value and reset the identifying value generator 16.

When an error in the predictors is signalled to the store controller 18 and the hash value H and distance value D currently being generated by the identifying value generator 16 match one of the lines within the identifying value table 14, then this is indicated by a match signal to the store controller 18 and instead of replacing an entry within the identifying value table 14, the count value C associated with that entry is incremented thereby giving an indication of how frequently that error in the predictors is occurring. The match signal also triggers a comparator 22 to compare the count value of the matching identifying value against a threshold value and, if this exceeds the threshold value, then controls a correction gating unit 24 to issue corrected behaviour signals to the prefetch unit 4. These corrected behaviour signals are stored within the identifying value entry of the identifying value table 14 and specify behaviours such as correcting a branch target address, identifying an instruction as a branch instruction when the instruction has not been identified as such by the branch predictors 10, correcting a prediction direction or other correcting behaviour(s). The table of errors 20 that are corrected will control which type of correction behaviours are supported.

Figure 3:
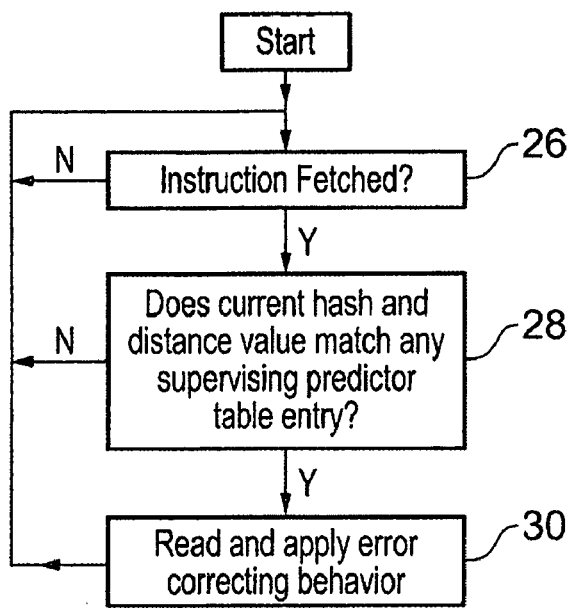
FIG. 3 is a flow diagram schematically illustrating the process of error correction by the supervising predictor.

FIG. 3 is a flow diagram schematically illustrating the operation of the supervising predictor 12 in correcting errors. At step 26 the process waits for an instruction to be fetched. At step 28 a comparison is made between the current hash value H and distance value D to see if this matches any table entry within the identifying value table 14 of the supervising predictor 12. If there is a match, then the correcting behaviour CB is read from the matching entry and applied to the prefetch unit 4 (or other points within the data processing apparatus 2) at step 30.

Figure 4:
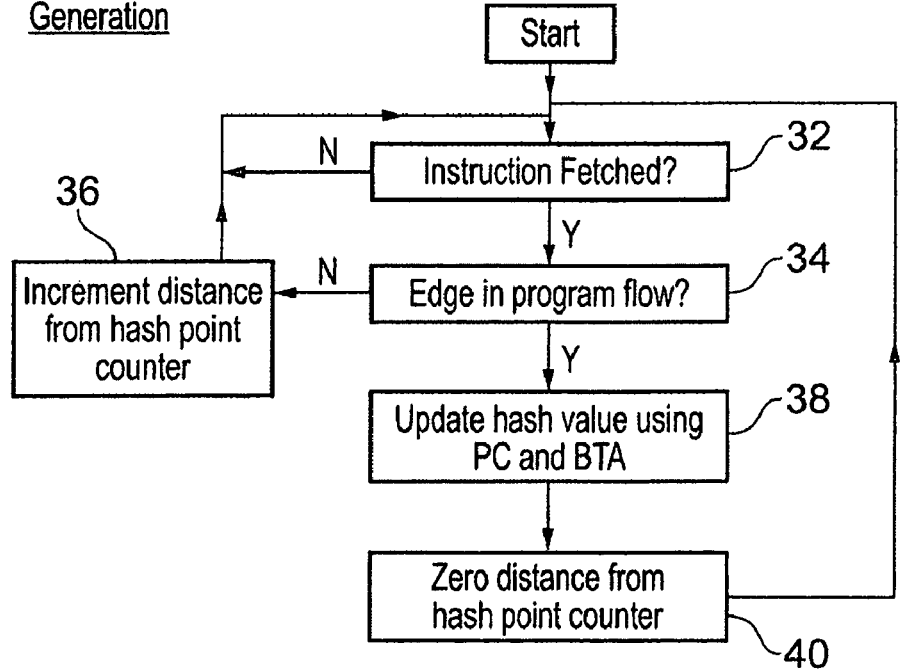
FIG. 4 is a flow diagram schematically illustrating the process of identifying value generation by the supervising predictor.

FIG. 4 schematically illustrates the processing performed in the generation of identifying values. At step 32 the process waits for an instruction to be fetched, at step 34 a determination is made as to whether or not the instruction fetched represents an edge in program flow (e.g. a non-sequential branch target address cache access has occurred). If the instruction fetched is not an edge in program flow, then step 36 increments the distance value D from the last hash point and processing returns to step 32. If the determination at step 34 was that an edge in program flow has been reached, then step 38 updates the current hash value H using a feedback version of at least the previous hash value in combination with an architectural current program counter value and a branch target address value associated with the execution point reached in the program flow. Step 40 then zeros the distance value D following the hash point. The process of FIGS. 3 and 4 may also be combined.

Figure 5:
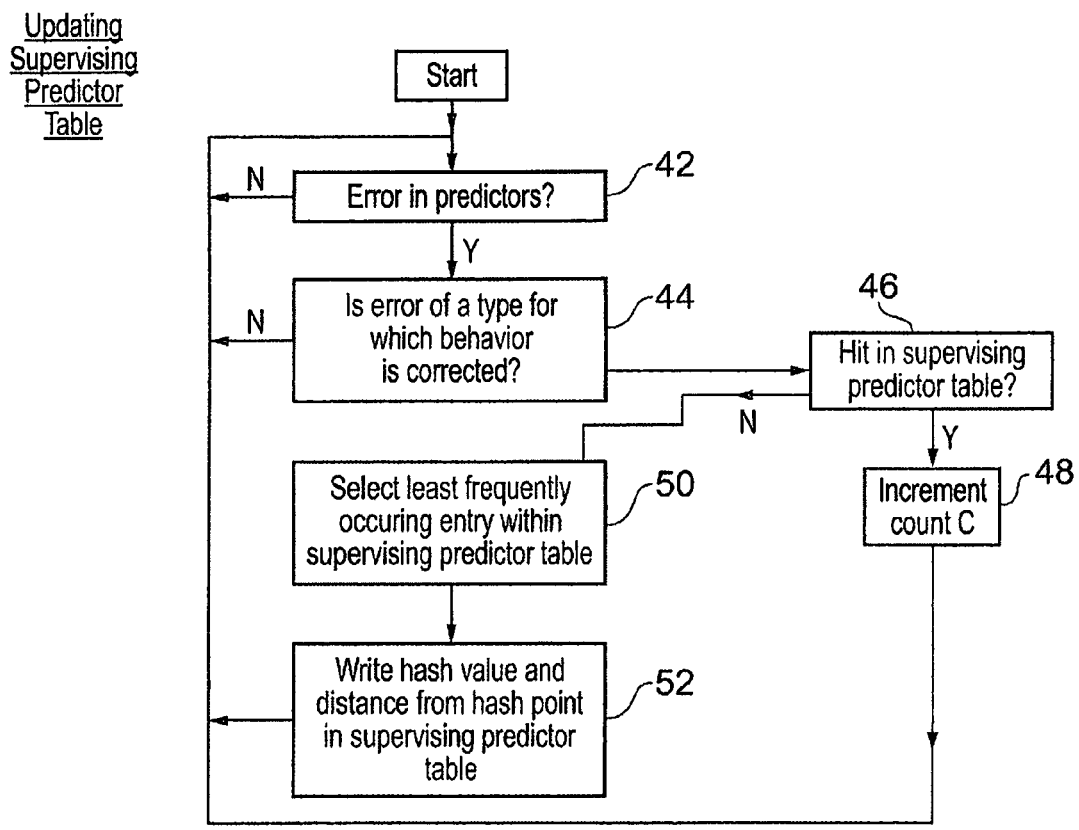
FIG. 5 is a flow diagram schematically illustrating the updating of identifying values stored by the supervising predictor.

FIG. 5 is a flow diagram illustrating the updating of the identifying value table 14. At step 42 the processing waits for an error in the predictors 10 to arise. When an error arises, step 44 uses the table of errors 20 that are corrected to identify if the error is of a type for which behaviour correction support is provided. If the error is of a supported type, then step 46 determines whether or not the hash value H and distance value D currently being generated by the identifying value generator 16 match an existing table entry. If there is such a match, then the error encountered has been previously encountered and step 48 increments the count value C associated with that table entry. Cyclically recurring errors typically recur many tens or hundreds of times and the threshold value associated with the count value C before the correcting behaviour is deployed can be set high in order to reduce the likelihood of false positives.

If the determination at step 46 is that the current hash value H and distance value D do not hit within the identifying value table 14, then step 50 selects the identifying value with the lowest count value C as a victim entry to be replaced. Step 52 then writes the current hash value H and distance value D from the hash point into the supervising predictor table 14 as an identifying value indicative of the program flow leading to the point at which the error in the predictors arises.

It will be appreciated that the processes of FIGS. 3, 4 and 5 can take place in parallel or in some other order.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of a stream of program instructions, said apparatus comprising:
    one or more branch predictors responsive to said stream of program instructions to generate branch predictions for at least some branch instructions within said stream of program instructions; and
    a supervising predictor, responsive to at least a stream of branch predictions generated by said one or more branch predictors, configured to identify whether one or more errors in said one or more branch predictors are one or more cyclically recurring errors, and to generate respective corrected behaviours for use when said one or more cyclically recurring errors occur.

2. Apparatus as claimed in claim 1, wherein said one or more cyclically recurring errors include incorrect branch predictions and said respective corrected behaviours include corrected branch predictions.

3. Apparatus as claimed in claim 1, wherein said one or more cyclically recurring errors include one or more of:
    an incorrect prediction direction;
    an incorrect identification of a program instruction as a branch instruction;
    an incorrect prediction of a branch target address;
    an incorrect identification of a type of branch instruction; and
    a missing prediction for a branch instruction.

4. Apparatus as claimed in claim 1, wherein said one or more cyclically recurring incorrect branch predictions arise as a consequence of one or more of:
    aliasing within a global history table;
    aliasing within a branch target address cache; and
    an out-of-date branch target address cache entry.

5. Apparatus as claimed in claim 1, wherein said one or more branch predictors are updated independently of said corrected behaviours, such that said one or more branch predictors operate to generate said branch predictions independently of said supervising predictor.

6. Apparatus as claimed in claim 1, wherein said supervising predictor tracks program flow following an error generated by said one or more branch predictors to generate an identifying value indicative of said program flow.

7. Apparatus as claimed in claim 6, wherein programs instructions within said stream of program instructions have respective associated program counter values and said identifying value is dependent upon program counter values of program instructions executed within said program flow.

8. Apparatus as claimed in claim 6, wherein said identifying value is a hash value updated upon occurrence of an update event in dependence upon a preceding value of said hash value and one or more characteristics of said a current state of said apparatus.

9. Apparatus as claimed in claim 8, wherein an update event comprises one or more of:
  execution of a program instruction;
  generation of a branch prediction by said one or more branch predictors; and
  a non-sequential access to a branch target address cache.

10. Apparatus as claimed in claim 8, wherein said one or more characteristics comprise:
  a program counter address of said currently executed instruction;
  a branch target address if said currently executed instruction is a taken branch; and
  a branch target address of an out of sequence access to a branch target address cache.

11. Apparatus as claimed in claim 6, wherein said identifying value is one of stored and updated within an identifying value memory when a next incorrect prediction is generated by said one or more branch predictors.

12. Apparatus as claimed in claim 11, wherein said identifying value stored within said identifying value memory has an associated count value indicative of how many times an incorrect prediction generated by said one or more branch predictors has occurred with a preceding program flow matching a program flow corresponding to said identifying value.

13. Apparatus as claimed in claim 12, wherein a corrected branch prediction is associated with an identifying value and said corrected behaviour is used in place of a corresponding cyclically recurring error when said count value exceeds a threshold level.

14. Apparatus for processing data under control of a stream of program instructions, said apparatus comprising:
  one or more branch predictor means for generating, in response to said stream of program instructions, branch predictions for at least some branch instructions within said stream of program instructions; and
  supervising predictor means for identifying, in response to at least a stream of branch predictions generated by said one or more branch predictors, whether one or more errors in said one or more branch predictors are one or more cyclically recurring errors, and for generating respective corrected behaviours for use when said one or more cyclically recurring errors occur.

15. A method of processing data under control of a stream of program instructions, said method comprising:
  in response to said stream of program instructions, generating branch predictions for at least some branch instructions within said stream of program instructions using one or more branch predictors; and
  in response to at least a stream of branch predictions generated by said one or more branch predictors, identifying whether one or more errors in said one or more branch predictors are one or more cyclically recurring errors, and generating respective corrected behaviours for use when said one or more cyclically recurring errors occur using a supervising predictor.

16. A method as claimed in claim 15, wherein said one or more cyclically recurring errors include incorrect branch predictions and said respective corrected behaviours include corrected branch predictions.

17. A method as claimed in claim 15, wherein said one or more cyclically recurring errors include one or more of:
  an incorrect prediction direction;
  an incorrect identification of a program instruction as a branch instruction;
  an incorrect prediction of a branch target address;
  an incorrect identification of a type of branch instruction; and
  a missing prediction for a branch instruction.

18. A method as claimed in claim 15, wherein said one or more cyclically recurring incorrect branch predictions arise as a consequence of one or more of:
  aliasing within a global history table;
  aliasing within a branch target address cache; and
  an out-of-date branch target address cache entry.

19. A method as claimed in claim 15, wherein said one or more branch predictors are updated independently of said corrected behaviours, such that said one or more branch predictors operate to generate said branch predictions independently of said supervising predictor.

20. A method as claimed in claim 15, wherein said supervising predictor tracks program flow following an error generated by said one or more branch predictors to generate an identifying value indicative of said program flow.

21. A method as claimed in claim 20, wherein programs instructions within said stream of program instructions have respective associated program counter values and said identifying value is dependent upon program counter values of program instructions executed within said program flow.

22. A method as claimed in claim 20, wherein said identifying value is a hash value updated upon occurrence of an update event in dependence upon a preceding value of said hash value and one or more characteristics of said a current state of a data processing apparatus executing said stream of program instructions.

23. A method as claimed in claim 22, wherein an update event comprises one or more of:
  execution of a program instruction;
  generation of a branch prediction by said one or more branch predictors; and
  a non-sequential access to a branch target address cache.

24. A method as claimed in claim 22, wherein said one or more characteristics comprise:
  a program counter address of said currently executed instruction;
  a branch target address if said currently executed instruction is a taken branch; and
  a branch target address of an out of sequence access to a branch target address cache.

25. A method as claimed in claim 20, wherein said identifying value is one of stored and updated within an identifying value memory when a next incorrect prediction is generated by said one or more branch predictors.

26. A method as claimed in claim 25, wherein said identifying value stored within said identifying value memory has an associated count value indicative of how many times an incorrect prediction generated by said one or more branch predictors has occurred with a preceding program flow matching a program flow corresponding to said identifying value.

27. A method as claimed in claim 26, wherein a corrected branch prediction is associated with an identifying value and said corrected behaviour is used in place of a corresponding cyclically recurring error when said count value exceeds a threshold level.

* * * * *